United States Patent
Banti et al.

(10) Patent No.: US 9,881,065 B2
(45) Date of Patent: *Jan. 30, 2018

(54) SELECTING SUPPLEMENTAL CONTENT FOR INCLUSION IN A SEARCH RESULTS PAGE

(71) Applicant: Amazon Technologies, Inc., Seattle, WA (US)

(72) Inventors: Edward Thomas Banti, Seattle, WA (US); Thomas Jay Hoover, Seattle, WA (US); Alexander Michael Spinelli, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,766

(22) Filed: May 11, 2016

(65) Prior Publication Data

US 2016/0253429 A1     Sep. 1, 2016

Related U.S. Application Data

(63) Continuation of application No. 14/095,428, filed on Dec. 3, 2013, now Pat. No. 9,367,627.

(51) Int. Cl.
*G06F 17/30* (2006.01)
*G06Q 30/02* (2012.01)

(52) U.S. Cl.
CPC .... *G06F 17/30554* (2013.01); *G06F 17/3053* (2013.01); *G06Q 30/0241* (2013.01)

(58) Field of Classification Search
CPC combination set(s) only.
See application file for complete search history.

(56) References Cited

U.S. PATENT DOCUMENTS

| 6,804,675 B1 | 10/2004 | Knight et al. | |
| 2010/0198628 A1* | 8/2010 | Rayner | G06Q 10/025 705/6 |
| 2012/0047483 A1* | 2/2012 | Amit | G06F 17/30861 717/104 |

\* cited by examiner

*Primary Examiner* — Shyue Jiunn Hwa
(74) *Attorney, Agent, or Firm* — Thomas | Horstemeyer, LLP (57) ABSTRACT

Disclosed are various embodiments that involve selecting supplemental content to be included with search results in a network page. At least one search result is generated by executing a search based at least in part on relevance to a search query. Supplemental content is selected based at least in part upon relevance to the search query without regard to the at least one search result. A subset of the supplemental content is selected in response to determining that the subset is permitted to be presented together in a search results page as defined by at least one compatibility rule. The search results page is generated to include the subset of the supplemental content and the search results.

20 Claims, 7 Drawing Sheets

SELECTING SUPPLEMENTAL CONTENT FOR INCLUSION IN A SEARCH RESULTS PAGE

CROSS-REFERENCE TO RELATED APPLICATIONS

This application is a continuation of and claims priority to U.S. patent application Ser. No. 14/095,428, entitled "SELECTING SUPPLEMENTAL CONTENT FOR INCLUSION IN A SEARCH RESULTS PAGE," and filed Dec. 3, 2013, which is incorporated herein by reference in its entirety.

BACKGROUND

Search engines allow users to search indexes of various types of items, such as products offered for sale, social networking profiles, web pages, images, videos, audio tracks, and/or other types of items. To search, a user provides a search query, which may be a string of terms, perhaps with Boolean or other connectors. The search engine receives the search query and executes a search against the index of items. In response to the search, a result set is returned. The search engine may then employ a relevance algorithm to rank the results. The relevance algorithm may take into account a variety of factors, such as closeness of match to the search query, location of matching terms in the item, popularity of the items, and so on. The results, or a subset of results, are then presented to the user in ranked order within a network page.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to selecting supplemental content for inclusion in a search results page. When a user executes a search query with a search engine, a search results page is returned. The search results constitute the primary content within this search results page. However, it may be desirable to include supplemental content in addition to the search results. The supplemental content may drive revenues for the operator of the search engine as much as, or even more than, the actual search results themselves. The supplemental content may be relevant to the search query, such that the user may benefit from viewing the supplemental content in the search page in lieu of, or in addition to, search results. The supplemental content may also serve the function of filling otherwise empty area on the user's display.

Various forms of supplemental content may include, for example, advertisements for external network sites, sponsored search result listings, recommendations for similar products, advertisements for merchants local to the user, and/or other supplemental content. The various forms of supplemental content may be provided by different systems, which may be controlled by different entities. The different systems that provide the supplemental content in response to the search query may employ vastly different relevance algorithms. Further, the different sources of supplemental content may have differing relevancies to the search query.

Embodiments of the present disclosure are configured to select supplemental content from multiple sources for inclusion in the search results page. In doing so, the differing relevancies of the sources may be taken into account, as well as the differing algorithms used by each in producing ranked results. Accordingly, a subset of the sources may be selected, while a subset of the sources may be excluded. Moreover, immediate monetary value may be weighed with downstream business value in order to select sources and supplemental content. In some scenarios, different layouts for the search results page may be employed to feature the supplemental content from the selected sources.

Figure 1:
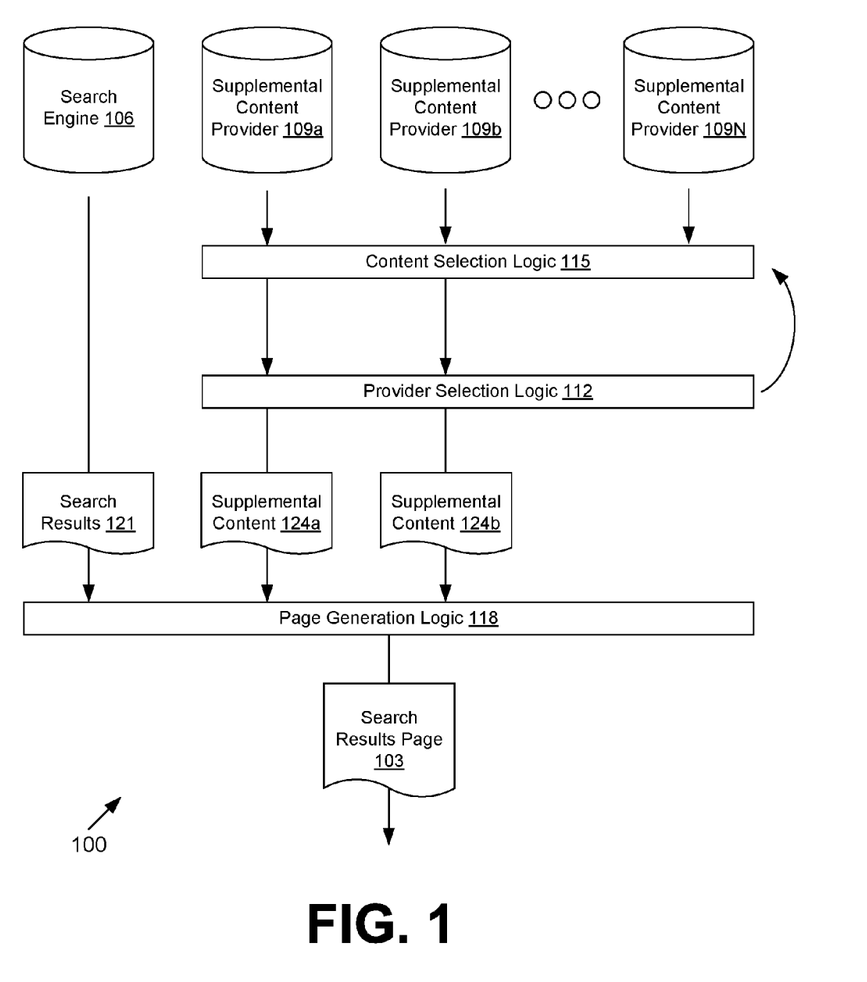
FIG. 1 is an example data flow diagram illustrating the process of generating a search results page in accordance with various embodiments of the present disclosure.

Turning now to FIG. 1, shown is an example data flow diagram 100 illustrating the process of generating a search results page 103 in accordance with various embodiments. In the data flow diagram 100, there are several sources for content to be included in the search results page 103: a search engine 106 and a plurality of supplemental content providers 109a, 109b . . . 109N. This is not intended to be exhaustive, and content may be obtained from additional sources in order to generate the search results page 103. Various logic is executed in order to generate the search results page 103: provider selection logic 112, content selection logic 115, page generation logic 118, and/or other logic.

When a search query is submitted, search results 121 are obtained from the search engine 106. Also, in this example, supplemental content 124a and 124b are obtained from the supplemental content providers 109a and 109b. To obtain the supplemental content 124a, 124b, the search query and/or other information may be supplied to the supplemental content providers 109a and 109b. The content selection logic 115 then obtains content from the supplemental content providers 109. In some cases, the content selection logic 115 may obtain supplemental content 124 only from supplemental content providers 109 that have been selected by the provider selection logic 112. Sets of content may be obtained from each of the selected supplemental content providers 109, and these sets of content may be in a ranked order according to relevance as determined by a respective algorithm for each supplemental content provider 109. The content selection logic 115 selects supplemental content 124a and 124b from these ranked sets of content according to another relevance algorithm that blends or weights the respective relevancies, taking into account relevancy to the search query, relevancy to the user, immediate monetary value, downstream business value, and/or other factors.

The provider selection logic 112 selects a subset of the supplemental content providers 109 based at least in part on mutual compatibility of their content, relevancy to the search query, relevancy to the user who initiated the search query, immediate monetary value, downstream business value, and/or other factors. In some cases, the selection decision by the provider selection logic 112 may trigger further processing by the content selection logic 115.

The search results 121, the supplemental content 124a, and the supplemental content 124b are provided to the page generation logic 118, which generates the search results page 103. In various embodiments, the layout of the search results page 103 may depend on the supplemental content 124a and 124b that is selected. For example, hyper-relevant supplemental content 124 may be rendered above the search results 121 or in a pop-up/pop-over dialog, while less relevant supplemental content 124 may be rendered alongside the search results 121, on a subsequent screen of the search results page 103 ("below-the-fold"), and/or in other locations. In the following discussion, a further description of the system and its components is provided, followed by a discussion of the operation of the same.

Figure 2:
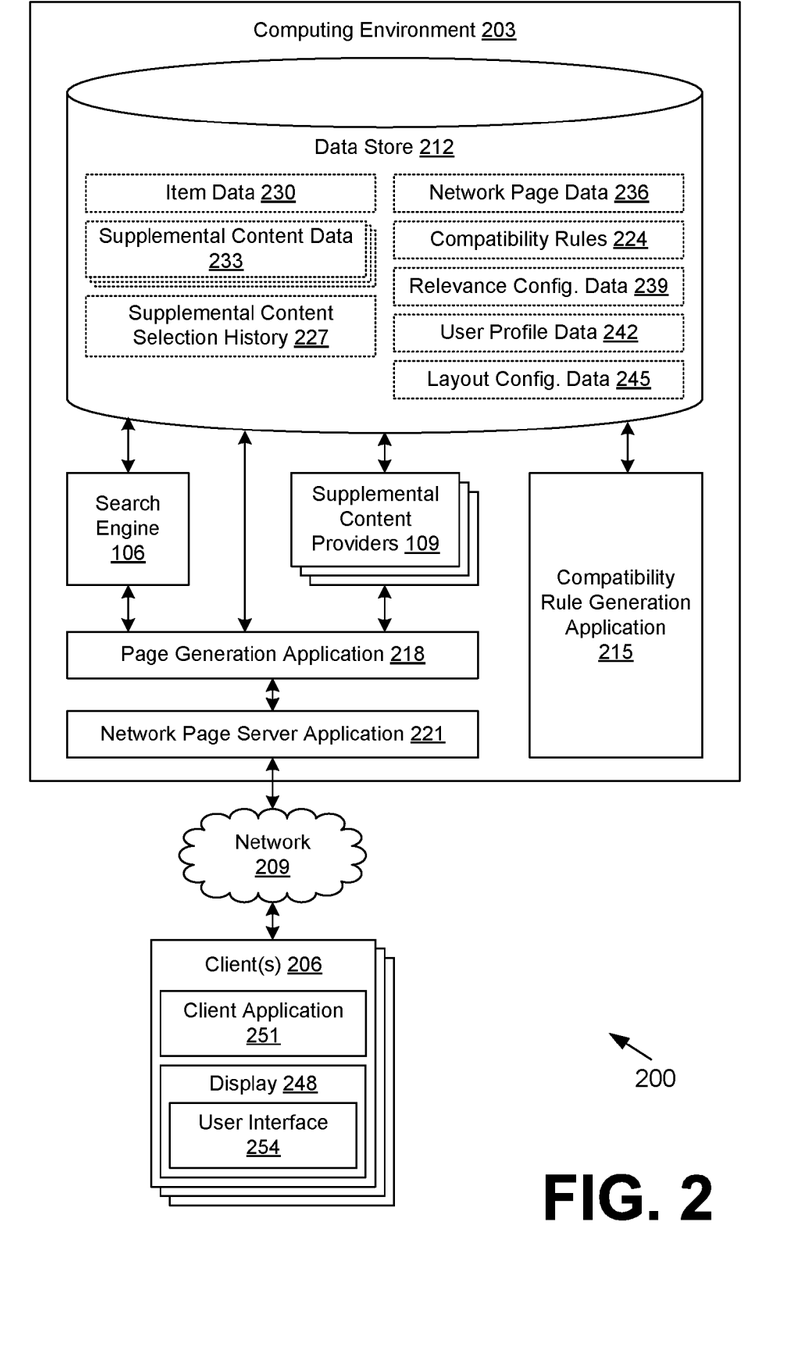
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more clients 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a search engine 106, a plurality of supplemental content providers 109, a compatibility rule generation application 215, a page generation application 218, a network page server application 221, and other applications, services, processes, systems, engines, or functionality not discussed in detail herein. The search engine 106 is executed to perform a search upon an item database using a search query and return a set of search results 121 (FIG. 1). The search results 121 may be ranked according to relevance, date, popularity, price, size, and/or other factors. The search engine 106 may also select the search results 121 based at least in part on user profile characteristics (e.g., user purchase history, user query history, user browse history, user demographic data, etc.), client 206 characteristics (e.g., client location, device type, browser type, etc.), and/or other data. Non-limiting examples of searches that may be performed via the search engine 106 may include product searches, service searches, image searches, music searches, video searches, a data search within a hosted computing resource, and/or other searches.

The supplemental content providers 109 are configured to provide supplemental content 124 (FIG. 1) responsive to the search query and, potentially, user profile characteristics (e.g., user purchase history, user query history, user browse history, user demographic data, etc.), client 206 characteristics (e.g., client location, device type, browser type, etc.), and/or other data. The supplemental content providers 109 may serve up different types of supplemental content 124. In one embodiment, the search engine 106 and the supplemental content providers 109 may be operated by different business units of an entity. As a non-limiting example, where the search results 121 correspond to products offered for online ordering from a merchant, the supplemental content 124 served by the supplemental content providers 109 may include products offered by brick-and-mortar stores near the user, products offered for online ordering from other merchants, advertisements for other goods and services, and so on. In one embodiment, the supplemental content providers 109 correspond to separate network services that may be operated on distinct computing devices within the computing environment 203. In some cases, one or more of the supplemental content providers 109 may be an external service operated by an external entity. In various embodiments, each of the supplemental content providers 109 may provide a ranked set of supplemental content 124, where the supplemental content 124 is ranked according to a distinct relevance algorithm associated with the particular supplemental content provider 109.

The compatibility rule generation application 215 is executed to generate compatibility rules 224 that determine whether different types of supplemental content 124 served by different supplemental content providers 109 are compatible or incompatible. For example, it may be determined that supplemental content 124 containing customer reviews of products are incompatible with supplemental content 124 containing advertisements to sign-up with a preferred customer program. It may be the case that a first supplemental content provider 109 is incompatible with a second supplemental content provider 109. Alternatively, it may be that a first supplemental content provider 109 is incompatible with a combination of a second supplemental content provider 109 with a third supplemental content provider 109.

The compatibility rule generation application 215 may, for example, examine supplemental content selection history 227 for multiple users to empirically determine which supplemental content providers 109 result in click-throughs, revenue, and/or other metrics. That is to say, it may be empirically determined that when supplemental content 124 from two particular supplemental content providers 109 are rendered in the same search results page 103 (FIG. 1), supplemental content 124 from one of the two supplemental content providers 109 is never or seldom selected. In another example, it may be that when the supplemental content 124 from the two particular supplemental content providers 109 are rendered in the same search results page 103, none of the supplemental content 124 is selected, or is seldom selected. Such supplemental content providers 109 may be deemed incompatible. Incompatibility may be defined in a strong manner, such as being incompatible for being included on the same search results page 103, or in a weaker manner, such as being incompatible for being included within the same screen of a search results page 103. In the latter case, it may be that supplemental content 124 from incompatible supplemental content providers 109 may be compatible for presentation within the same search results page 103 but not to be presented in the same screen (or side-by-side, within a certain distance, for certain content items, and so on).

The page generation application 218 is executed to assemble the search results pages 103 and/or other network pages. To this end, the page generation application 218 may include, for example, the provider selection logic 112 (FIG. 1), the content selection logic 115 (FIG. 1), the page generation logic 118 (FIG. 1), and/or other logic. The page generation application 218 may use a relevance-ranking approach that differs from that of the supplemental content providers 109. For example, the page generation application 218 may be capable of assigning relevance scores to supplemental content 124 across different supplemental content providers 109 that may use different relevance ranking approaches. The page generation application 218 may take in to account immediate monetary value as well as downstream business value in assigning relevance scores. The page generation application 218 may generate a page layout for the search results page 103 based upon the relevant supplemental content 124. In doing so, the page generation application 218 may select a particular page layout and/or assign content to the particular page layout based upon the relevant supplemental content 124.

The network page server application 221 is executed to receive search query requests from clients 206 and to respond with the search results pages 103 and/or other pages. The network page server application 221 may serve information via hypertext transfer protocol (HTTP), simple object access protocol (SOAP), representational state transfer (REST), and/or other protocols. The network page server application 221 may comprise a commercially available HTTP server such as, for example, Apache® HTTP Server, Apache® Tomcat®, Microsoft® Internet Information Services (IIS), and so on.

The data stored in the data store 212 includes, for example, item data 230, supplemental content data 233, supplemental content selection history 227, network page data 236, compatibility rules 224, relevance configuration data 239, user profile data 242, layout configuration data 245, and potentially other data. The item data 230 may store information relating to items that are searchable by the search engine 106. Such items may include products, services, web pages, social network profiles, music, videos, and so on. In various scenarios, the item data 230 may store data such as title, description, keywords, price, quantity, customer reviews, and/or other data.

The supplemental content data 233 corresponds to the different forms of supplemental content 124 provided by the supplemental content providers 109. Such supplemental content 124 may include advertising, related items, customer reviews, local offers, and/or other forms of supplemental content 124. In one embodiment, the supplemental content data 233 associated with different supplemental content providers 109 may be maintained in separate data stores 212.

The supplemental content selection history 227 includes selection or browse history to indicate click-throughs for supplemental content 124 on search results pages 103. The supplemental content selection history 227 may include context to indicate the other supplemental content 124 present on a page when particular supplemental content 124 was selected, where the supplemental content 124 was situated in a display layout, sales conversions, and/or other information for assessing the efficacy of the presentations of the supplemental content 124.

The network page data 236 may include various data employed in generating search results pages 103 and/or other network pages. The network page data 236 may include hypertext markup language (HTML), extensible markup language (XML), cascading style sheets (CSS), images, text, audio, video, templates, and/or other data. The compatibility rules 224 define whether supplemental content 124 from different supplemental content providers 109 are compatible or are incompatible. The compatibility rules 224 may be manually created or may be dynamically generated by the compatibility rule generation application 215.

The relevance configuration data 239 includes configuration data for the various relevance ranking algorithms or approaches employed by the page generation application 218 and the various supplemental content providers 109. For example, the relevance configuration data 239 may indicate which factors are to be considered in generating relevance rankings, and constants used in blending or weighting the factors. The user profile data 242 may include profile characteristics for users. Such profile characteristics may include product preferences, browse history, order history, demographic information, location information, and/or other information. The layout configuration data 245 configures the selection or generation of page layouts by the page generation application 218.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 248. The display 248 may comprise, for example, one or more devices such as liquid crystal display (LCD) displays, gas plasma-based flat panel displays, organic light-emitting diode (OLED) displays, electrophoretic ink (E ink) displays, LCD projectors, or other types of display devices, etc.

The client 206 may be configured to execute various applications such as a client application 251 and/or other applications. The client application 251 may be executed in a client 206, for example, to access network content served up by the computing environment 203 and/or other servers, thereby rendering a user interface 254 on the display 248. To this end, the client application 251 may comprise, for example, a browser, a dedicated application, etc., and the user interface 254 may comprise a network page, an application screen, etc. The client 206 may be configured to execute applications beyond the client application 251 such as, for example, email applications, social networking applications, word processors, spreadsheets, and/or other applications.

Next, a general description of the operation of the various components of the networked environment 200 is provided. To begin, a user at a client 206 uses a client application 251 to send a search query via the network 209 to the network page server application 221. The network page server application 221 invokes the page generation application 218 to generate a search results page 103 in response to the search query. Additionally, identification of the user and/or the client 206 may be provided to the page generation application 218 in order to personalize the search results page 103 for the user.

The page generation application 218 uses the search engine 106 to execute a search based at least in part on the search query, user profile characteristics, and/or other information. In addition, the page generation application 218 obtains supplemental content 124 from selected supplemental content providers 109. The supplemental content providers 109 may be selected based at least in part on a compatibility rule 224 that defines whether supplemental content 124 from a first supplemental content provider 109 is permitted to be rendered in association with supplemental content 124 from a second supplemental content provider 109.

The page generation application 218 then generates a search results page 103 configured to present supplemental content from the selected supplemental content providers 109 and at least a portion of the search results 121. The page generation application 218 generates a display layout for the search results page 103 based upon the search results 121 and/or the supplemental content 124 that is selected. For example, the layout for the supplemental content 124 may be generated based at least in part on respective relevance scores for the supplemental content 124 using a blended or weighted relevance approach that takes into account different relevance approaches used by the different supplemental content providers 109. New relevance scores may be generated for the supplemental content 124 by weighting relevance scores provided by the respective relevance approaches based at least in part on the relevancies of the supplemental content providers 109 to the search query.

As a non-limiting example, suppose that the relevance scores from a first supplemental content provider 109 correlate to the immediate monetary value from the content when converted. It may be the case that the immediate monetary value is rather negligible, but the downstream business value of promoting the business associated with the first supplemental content provider 109 is substantial. Thus, in the blended relevance approach, the relevance scores may be weighted by a factor that greatly increases the relevance scores. Suppose that a first result from a first provider has an immediate monetary value of $0.01, while a second result from a second provider has an immediate monetary value of $5.00. After weighting, suppose that the first result has a blended value of $10.00, and the second result has a blended value of $6.00. The page generation application 218 may therefore select the first result for inclusion in the search results page 103 in place of, or with a higher prominence, than the second result. Additional factors may also weigh in to the blended relevance approach. For example, if the second result were hyper-relevant to the search query, the second result may achieve a higher blended relevance score than the first result.

The blended relevance scores may determine the layout of the search results page 103 as well as the position of supplemental content 124 within the layout. The search results page 103 is provided to the network page server application 221, and data encoding the search results page 103 is then returned to the client 206 via the network 209. In some embodiments, at least a portion of the content of the search results page 103 may be provided asynchronously using technologies such as asynchronous JavaScript and XML (AJAX). In some cases, an "infinite" scrolling layout may be used, where additional search results 121 and supplemental content 124 may be provided responsive to a user scrolling to a new screen of the search results page 103.

Figure 3A:
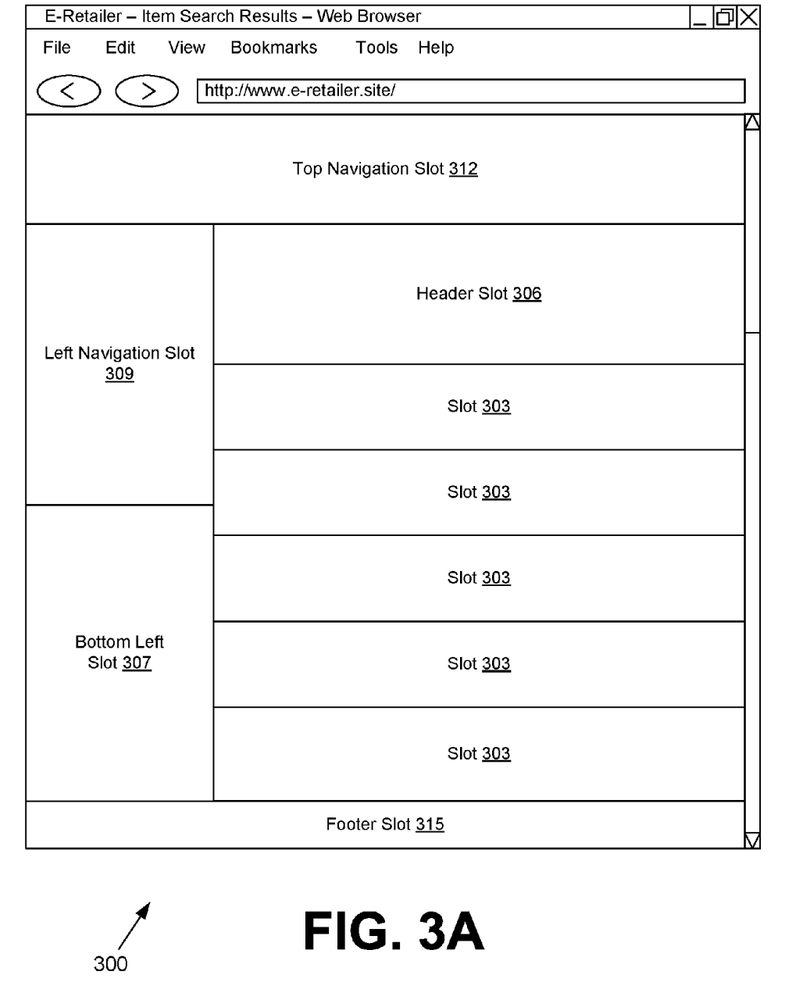
FIGS. 3A and 3B are pictorial diagrams of example user interfaces rendered by a client in the networked environment of FIG. 2 according to various embodiments of the present disclosure.

Referring next to FIG. 3A, shown is one example of a user interface 254 (FIG. 2) rendered by client application 251 (FIG. 2) executing in a client 206 (FIG. 2) in the networked environment 200 (FIG. 2) according to various embodiments of the present disclosure. In particular, FIG. 3A depicts a network page layout 300 shown within the user interface 254. The network page layout 300 is divided into a plurality of slots 303, including a header slot 306, a bottom left slot 307, a left navigation slot 309, a top navigation slot 312, and a footer slot 315. In one embodiment, the network page layout 300 comprises at least one table in HTML. In another embodiment, the network page layout 300 comprises logical divisions in HTML and/or XML, for example, by using DIV elements and CSS. In various embodiments, at least some of the slots 303 may be aligned relative to one another in rows and/or columns.

The network page layout 300 is merely one example of how a network page may be divided into a number of slots 303 corresponding to display regions. The page generation application 218 (FIG. 2) may select or generate the network page layout 300 based at least in part on the layout configuration data 245 (FIG. 2). For example, the slots 303 may be selected for displaying search results 121 (FIG. 1) from the search engine 106 (FIG. 2), while the header slot 306 and the bottom left slot 307 may be used for displaying supplemental content 124 (FIG. 1). It may be that supplemental content 124 included in the header slot 306 may be of a greater relevance than the supplemental content 124 included in the bottom left slot 307, based on the relative prominence of the header slot 306 as compared to the bottom left slot 307.

Furthermore, although the slots 303 of the network page layout 300 are indicated with a certain size relative to the user interface 254, it is understood that the slots 303 may be fixed in size or may change in size based on other attributes (e.g., glue elements, constraints, etc.) and/or what features are assigned to each slot 303. For example, when no features are assigned to a particular slot 303, that slot 303 may collapse in area and occupy no display region of the user interface 254. However, in another embodiment, the particular slot 303 may comprise a display region having a fixed or proportional size while including no features.

Figure 3B:
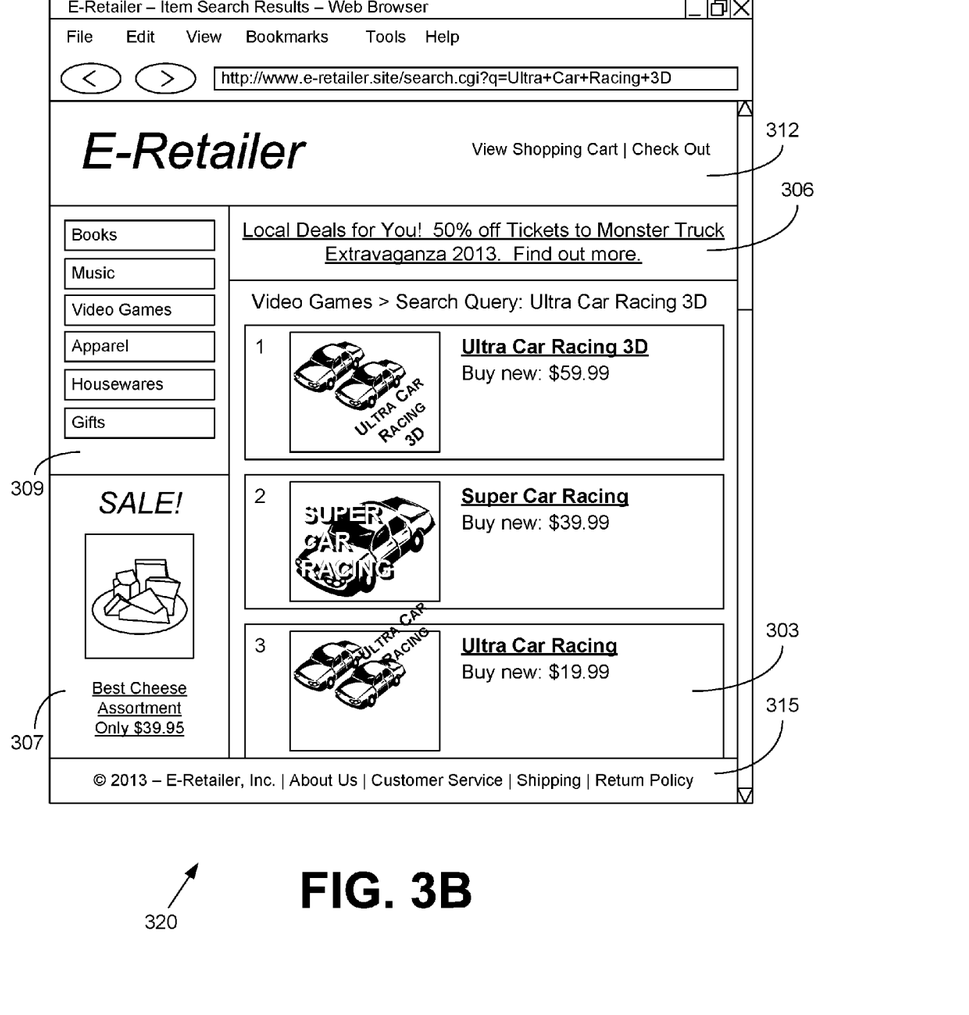

Moving on to FIG. 3B, shown is another example of a user interface 254 (FIG. 2) rendered by a client application 251 (FIG. 2) executed in a client 206 (FIG. 2) in the networked environment 200 (FIG. 2) according to various embodiments. The user interface 254 comprises a network page layout 320 that corresponds to a search results page 103 (FIG. 1). Moreover, the network page layout 320 corresponds to the network page layout 300 (FIG. 3A) with the various slots being populated with content.

In this example, the slot(s) 303 have been populated with search results 121 (FIG. 1) for a search query "Ultra Car Racing 3D" executed within a "Video Games" department. In addition, the header slot 306 and the bottom left slot 307 have been populated with supplemental content 124 (FIG. 1) provided by two different supplemental content providers 109 (FIG. 1). The supplemental content 124 in the header slot 306 pertains to a "local offer" for discounted tickets to an event, while the supplemental content 124 in the bottom left slot 307 pertains to a product offered for sale online. Although the supplemental content 124 shown in the header slot 306 and the bottom left slot 307 pertain respectively to a single unit of content, it is understood that the supplemental content 124 assigned to a particular slot or location may be nested, or may include a series of content units. The page generation logic 118 (FIG. 1) may be configured to re-rank or rearrange such nested content.

The supplemental content 124 in the header slot 306 is more relevant to the search query than the supplemental content 124 in the bottom left slot 307. However, the supplemental content 124 in the header slot 306 may result in a lesser immediate monetary value upon conversion. That is to say, the operator of the network site may make less money via the local offer than a product offered for online ordering. Nonetheless, the local offer may have a greater downstream business value, e.g., building a "local offers" business, that may outweigh the lower immediate monetary value as determined by a relevance ranking approach that blends the relevance as reported by the supplemental content providers 109. Thus, ultimately, the "local offers" content is given a more prominent position in the network page layout 320 than the online product offer content.

Figure 4:
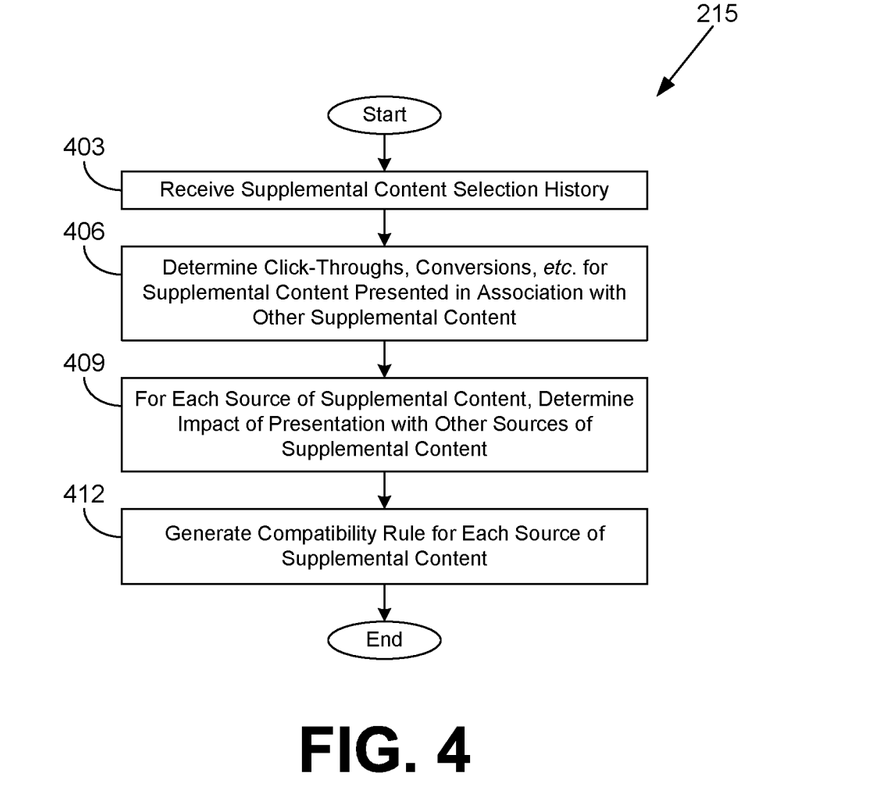
FIG. 4 is a flowchart illustrating one example of functionality implemented as portions of a compatibility rule generation application executed in a computing environment in the networked environment of FIG. 2 according to various embodiments of the present disclosure.

Referring next to FIG. 4, shown is a flowchart that provides one example of the operation of a portion of the compatibility rule generation application 215 according to various embodiments. It is understood that the flowchart of FIG. 4 provides merely an example of the many different types of functional arrangements that may be employed to implement the operation of the portion of the compatibility rule generation application 215 as described herein. As an alternative, the flowchart of FIG. 4 may be viewed as depicting an example of elements of a method implemented in the computing environment 203 (FIG. 2) according to one or more embodiments.

Beginning with box 403, the compatibility rule generation application 215 receives supplemental content selection history 227 (FIG. 2) for a plurality of users. The supplemental content selection history 227 may be filtered or requested for a certain time period, e.g., the previous month, the previous year, a previous season, and so on. In some cases, the supplemental content selection history 227 may be filtered for a specific user or group of users meeting a certain profile characteristics, e.g., all users who have purchased a certain item, all users who reside in a certain geographic area, and so on.

In box 406, using the received supplemental content selection history 227, the compatibility rule generation application 215 determines click-throughs, conversions, sales, etc. for supplemental content 124 (FIG. 1) from a particular supplemental content provider 109 (FIG. 2) that is presented in association with supplemental content 124 from another supplemental content provider 109. In box 409, for each source of supplemental content 124, the compatibility rule generation application 215 determines the impact of presentation with other sources of supplemental content 124. For example, content from source A when presented with content from source B may result in far fewer sales (i.e., fewer beyond a threshold) than when content from source A is presented with content from source C.

In box 412, the compatibility rule generation application 215 generates a compatibility rule 224 (FIG. 2) for each source of supplemental content 124. Each compatibility rule 224 may indicate the supplemental content providers 109 with which each supplemental content provider 109 is compatible or incompatible. The compatibility rules 224 may be applied universally, during specific time periods, or for users meeting specific criteria, e.g., according to user profile data 242 (FIG. 2). Thereafter, the portion of the compatibility rule generation application 215 ends.

Figure 5:
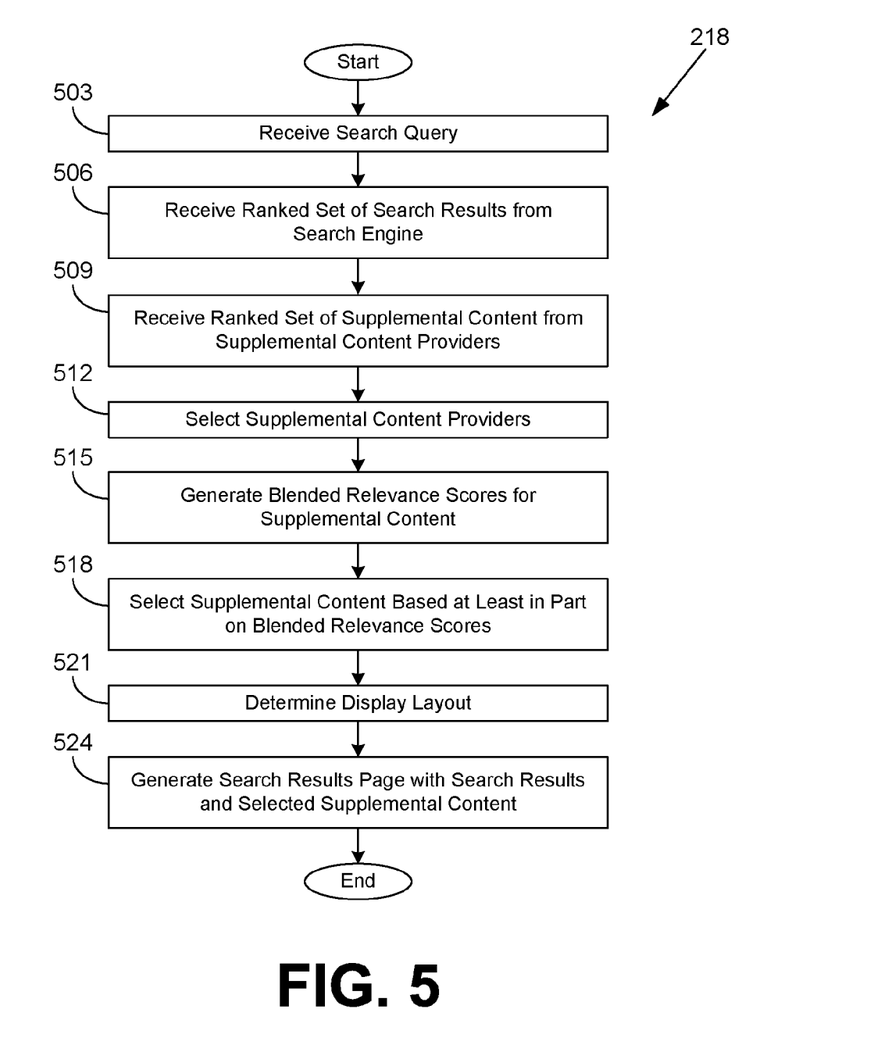
FIG. 5 is a flowchart illustrating one example of functionality implemented as portions of a page generation application executed in a computing environment in the networked environment of FIG. 2 according to various embodiments of the present disclosure.

Referring next to FIG. 5, shown is a flowchart that provides one example of the operation of a portion of the page generation application 218 according to various embodiments. It is understood that the flowchart of FIG. 5 provides merely an example of the many different types of functional arrangements that may be employed to implement the operation of the portion of the page generation application 218 as described herein. As an alternative, the flowchart of FIG. 5 may be viewed as depicting an example of elements of a method implemented in the computing environment 203 (FIG. 2) according to one or more embodiments.

Beginning with box 503, the page generation application 218 receives a search query. In box 506, the page generation application 218 receives a ranked set of search results 121 (FIG. 1) from a search engine 106 (FIG. 2). In doing so, the page generation application 218 executes a search by the search engine 106 using the search query and possibly other data. The search results 121 are ranked based at least in part on a relevance ranking approach employed by the search engine 106.

In box 509, the page generation application 218 receives a ranked set of supplemental content 124 (FIG. 1) from one or more supplemental content providers 109. Each of these ranked sets may be ranked according to different relevance approaches. In box 512, the page generation application 218 selects a subset of supplemental content providers 109 (FIG. 2). For example, the supplemental content providers 109 may be selected based at least in part on compatibility rules 224 (FIG. 2), relevance to the search query, immediate monetary value, downstream business value, and/or other factors.

In box 515, the page generation application 218 generates blended relevance scores for the supplemental content 124 using a different relevance approach. The different relevance approach may take into account immediate monetary value, downstream business value, user personalization, relevance to the search query, and/or other factors. In box 518, the page generation application 218 selects a subset of the supplemental content 124 based at least in part on the blended relevance scores.

In box 521, the page generation application 218 determines a display layout for the search results page 103 (FIG. 1) using the layout configuration data 245 (FIG. 2), the selected subset of supplemental content 124, characteristics of the client 206 (FIG. 2) and of the display 248 (FIG. 2), and/or other factors. In box 524, the page generation application 218 generates the search results page 103 with the search results 121 and the selected subset of supplemental content 124. In some cases, the search results page 103 may be generated based at least in part on the compatibility rules 224 so as to ensure that incompatible content is not presented on the same screen, within a certain distance, adjacent, or according to other compatibility criteria. Thereafter, the portion of the page generation application 218 ends.

Figure 6:
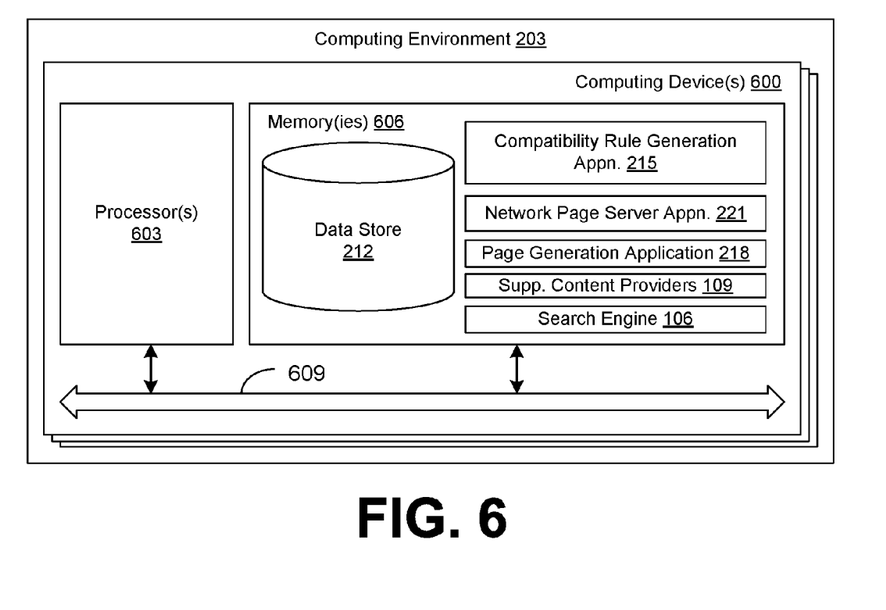
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the search engine 106, the supplemental content providers 109, the compatibility rule generation application 215, the page generation application 218, the network page server application 221, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the search engine 106, the supplemental content providers 109, the compatibility rule generation application 215, the page generation application 218, the network page server application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the compatibility rule generation application 215 and the page generation application 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search engine 106, the supplemental content providers 109, the compatibility rule generation application 215, the page generation application 218, and the network page server application 221, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the search engine 106, the supplemental content providers 109, the compatibility rule generation application 215, the page generation application 218, and the network page server application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

generate a plurality of search results by executing a search based at least in part on relevance to a search query;

determine that a first type of supplemental content provided by a first supplemental content provider is permitted to be presented in a search results page with a second type of supplemental content provided by a second supplemental content provider as defined by at least one compatibility rule, wherein the at least one compatibility rule is user-specific based at least in part on a user profile, the at least one compatibility rule being determined using empirical data for a plurality of users, the empirical data comprising a history of click-throughs when supplemental content from the first supplemental content provider and the second supplemental content provider are presented together in search results pages, the empirical data further indicating orders beyond a threshold when the supplemental content from the first supplemental content provider and the second supplemental content provider are presented together in the search results pages;

receive a subset of the supplemental content from the first supplemental content provider and the second supplemental content provider based at least in part on the search query without regard to the plurality of search results; and generate the search results page, wherein the search results page includes a subset of the plurality of search results and the subset of the supplemental content.

2. The non-transitory computer-readable medium of claim 1, wherein the history of click-throughs comprises a user-associated supplemental content selection history.

3. The non-transitory computer-readable medium of claim 1, wherein the first type of supplemental content provided by the first supplemental content provider is permitted to be presented together in the search results page with the second type of supplemental content provided by the second supplemental content provider only when not on a same screen of the search results page.

4. The non-transitory computer-readable medium of claim 1, wherein the supplemental content from the first supplemental content provider and the second supplemental content provider is received via at least one network service.

5. The non-transitory computer-readable medium of claim 1, wherein the first supplemental content provider uses a first relevance approach, the second supplemental content provider uses a second relevance approach, and a layout of the subset of the supplemental content in the search results page is based at least in part on a blended relevance of the first relevance approach and the second relevance approach.

6. The non-transitory computer-readable medium of claim 1, wherein in response to scrolling the search results page, the search results page is updated to provide at least one additional search result and additional supplemental content that is selected according to the at least one compatibility rule.

7. A system, comprising:

at least one computing device in communication with at least one data store; and at least one application executable in the at least one computing device, wherein when executed the at least one application causes the at least one computing device to at least:

generate at least one search result by executing a search based at least in part on relevance to a search query;

receive supplemental content from at least one network service based at least in part upon relevance to the search query without regard to the at least one search result, wherein the supplemental content comprises a first supplemental content item from a first supplemental content provider and a second supplemental content item from a second supplemental content provider;

select a subset of the supplemental content comprising the first supplemental content item and the second supplemental content item in response to determining that the subset of the supplemental content is permitted to be presented together in a search results page as defined by at least one compatibility rule stored in the at least one data store, wherein the at least one compatibility rule is user-specific based at least in part on a user profile, the at least one compatibility rule being determined based at least in part on empirical data for a plurality of users, the empirical data comprising a history of click-throughs when the supplemental content from the first supplemental content provider and the second supplemental content provider are presented together in search results pages, the empirical data further indicating orders being beyond a threshold when the supplemental content from the first supplemental content provider and the second supplemental content provider are presented together in the search results pages; and generate the search results page comprising the subset of the supplemental content and the at least one search result.

8. The system of claim 7, wherein the history of click-throughs comprises a user-associated supplemental content selection history.

9. The system of claim 7, wherein the at least one compatibility rule further defines that the subset of the supplemental content is permitted to be presented together in the search results page only when the first supplemental content item of the subset of the supplemental content is not presented on a same screen of the search results page with the second supplemental content item of the subset of the supplemental content.

10. The system of claim 7, wherein the supplemental content from the at least one network service comprises content from a plurality of supplemental content providers.

11. The system of claim 7, wherein the supplemental content received from the at least one network service comprises a plurality of ranked sets of supplemental content, the plurality of ranked sets being ranked based at least in part upon respective relevance approaches, and a layout of the subset of the supplemental content in the search results page is based at least upon a blended relevance of the respective relevance approaches.

12. The system of claim 7, wherein in response to scrolling the search results page, the search results page is updated to provide at least one additional search result and additional supplemental content that is selected according to the at least one compatibility rule.

13. A method, comprising:
receiving, by at least one computing device, a search query from a client computing device;
generating, by the at least one computing device, a plurality of search results by executing a search based at least in part upon relevance to the search query;

determining, by the at least one computing device, that a first supplemental content provider is permitted to be presented in a network page with a second supplemental content provider as defined by at least one compatibility rule, wherein the at least one compatibility rule is user-specific based at least in part on a user profile, the at least one compatibility rule being determined based at least in part on empirical data for a plurality of users, the empirical data comprising a history of click-throughs when supplemental content from the first supplemental content provider and the second supplemental content provider are presented together in search results pages, the empirical data further indicating orders being beyond a threshold when the supplemental content from the first supplemental content provider and the second supplemental content provider are presented together in the search results pages;

selecting, by the at least one computing device, a subset of the supplemental content from the first supplemental content provider and the second supplemental content provider based at least in part upon relevance to the search query, wherein the subset of the supplemental content is selected without regard to the plurality of search results;

generating, by the at least one computing device, the network page comprising a subset of the plurality of search results and the subset of the supplemental content from the first supplemental content provider and the second supplemental content provider; and sending, by the at least one computing device, the network page to the client computing device.

14. The method of claim 13, wherein a layout of the subset of the supplemental content in the network page is determined based at least in part upon relevance to the search query.

15. The method of claim 13, wherein the first supplemental content provider uses a first relevance approach, the second supplemental content provider uses a second relevance approach, and a layout of the subset of the supplemental content in the network page is based at least in part on a blended relevance of the first relevance approach and the second relevance approach.

16. The method of claim 13, wherein the history of click-throughs comprises a supplemental content selection history associated with the client computing device.

17. The method of claim 13, wherein the history of click-throughs comprises a supplemental content selection history associated with the plurality of users.

18. The method of claim 17, wherein the supplemental content selection history is filtered for a certain time period.

19. The method of claim 13, wherein when compatible, the supplemental content selected from the first supplemental content provider and the second supplemental content provider is permitted to be presented together in the network page only when not adjacent in the network page.

20. The method of claim 13, further comprising updating the search results page to provide at least one additional search result and additional supplemental content that is selected according to the at least one compatibility rule in response to scrolling the search results page.

* * * * *